United States Patent
Nakamura

(10) Patent No.: US 8,031,571 B2
(45) Date of Patent: Oct. 4, 2011

(54) SIGNAL DRIVE APPARATUS AND OPTICAL PICKUP APPARATUS USING THE SAME

(75) Inventor: Masashi Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1279 days.

(21) Appl. No.: 11/446,365

(22) Filed: Jun. 5, 2006

(65) Prior Publication Data

US 2006/0291348 A1 Dec. 28, 2006

(30) Foreign Application Priority Data

Jun. 23, 2005 (JP) ................................. 2005-183743

(51) Int. Cl.
*G11B 7/00* (2006.01)
(52) U.S. Cl. .................................. 369/53.37; 369/59.14
(58) Field of Classification Search ........................ None
See application file for complete search history.

(56) References Cited

U.S. PATENT DOCUMENTS

| | | | | |
|---|---|---|---|---|
| 7,518,454 | B2 * | 4/2009 | Yamashita | 330/255 |
| 2001/0043532 | A1 * | 11/2001 | Tsuchinaga et al. | 369/53.19 |
| 2004/0090901 | A1 * | 5/2004 | Katayama | 369/112.24 |

FOREIGN PATENT DOCUMENTS

| | | |
|---|---|---|
| JP | 62-269419 A | 11/1987 |
| JP | 09-282705 A | 10/1997 |
| JP | 2001-053558 A | 2/2001 |
| JP | 2001-202646 A | 7/2001 |
| JP | 2002-050066 A | 2/2002 |
| JP | 2003-077148 A | 3/2003 |
| JP | 2004-158118 A | 6/2004 |
| JP | 2004-273680 A | 9/2004 |
| JP | 2005-151427 A | 6/2005 |

* cited by examiner

*Primary Examiner* — Christopher Lamb
(74) *Attorney, Agent, or Firm* — Rader, Fishman & Grauer PLLC

(57) ABSTRACT

A signal drive apparatus includes a first buffer circuit where a signal converted into an electric signal from a first light signal is amplified; a second buffer circuit where a signal converted into an electric signal from a second light signal is amplified; a control circuit causing one of the first and second buffer circuits to be in an operating state and causing an output stage of the other buffer circuit to be in an idle state of a high impedance, so as to output a changeover control signal which picks up either the first or the second light signal; and a voltage changeover circuit causing any one of the output stages of the first and the second buffer circuits to be in the idle state and supplying a transistor constituting the output stage with a bias voltage equal to or less than a withstand voltage of the transistor.

6 Claims, 5 Drawing Sheets

SIGNAL DRIVE APPARATUS AND OPTICAL PICKUP APPARATUS USING THE SAME

BACKGROUND OF THE INVENTION

1. Field of the Invention

The present invention relates to a signal drive apparatus in which a plurality of buffer circuits are arranged in parallel and the buffer circuits are switched to output a signal and an optical pickup apparatus using the signal drive apparatus. In particular, the buffer circuits having a plurality of light detecting circuits are switched to disconnect the buffer circuit for optical detection which is not in operation, and an optical detection signal is supplied to a following signal-processing circuit via a flexible substrate (or cable).

2. Description of the Related Art

FIG. 1 shows a conventional optical pickup apparatus 200 which has external changeover switches, switches the changeover switches, selects signals detected by a plurality of PD's (photo-detecting diode), and transfers the thus selected data by means of one flexible substrate (also referred to as a cable). This optical pickup apparatus 200 is constituted by an OEIC (Optical Electoro IC; photoelectric conversion integrated circuit) 201 for BD (Blu-ray laser diode), an OEIC 202 for DVD (Digital Versatile Disc)/CD (Compact Disc), a switch 203 for switching between outputs from these, one flexible substrate 204, and a signal processing IC.

During recording and reproduction by means of a Blu ray LD (Blu ray laser diode), a laser diode for DVD/CD stops emitting light or, alternatively, is operated to transfer any one of the signals (data) of the OEIC 201 for BD and the OEIC 202 for DVD/CD by means of one flexible substrate. Thus, the changeover switch 203 is provided for choosing the signals alternatively and transmitting the signal from any one of the OEIC's.

When transferring the output data to a signal-processing IC 205 from the OEIC 201 for BD, the changeover switch 203 is switched to the OEIC 201 side for BD, and the output data (signal) from the OEIC 201 for BD is outputted to the flexible substrate 204. At the same time, a drive circuit provided at a following stage of the OEIC 202 for DVD/CD is in operation. However, since it is switched with the changeover switch 203, the output of OEIC for DVD/CD does not adversely influence the operation of the drive circuit in an output stage of the OEIC 201 for BD.

Conversely, when transferring the output signal from the OEIC 202 for DVD/CD via the flexible substrate 204 to a signal-processing (IC) circuit 205, the changeover switch 203 is switched to the OEIC 202 side for DVD/CD. Then, the signal outputted from the OEIC for DVD/CD is transferred to the signal-processing IC 205 through the flexible substrate 204.

At this time, since the drive circuit of the output stage of the OEIC 201 for BD is switched with the changeover switch 203, it does not affect the output of the drive circuit of the OEIC for DVD/CD.

Although one flexible substrate is arranged, using the switch leads to a disadvantage that a space is needed and costs are high.

Another conventional optical pickup apparatus 250 is shown in FIG. 2. This optical pickup apparatus 250 is arranged to use two flexible substrates. An output signal of an OEIC 251 for BD is outputted to a signal-processing IC 255 via a flexible substrate 253. Further, an output signal of an OEIC 252 for DVD/CD is outputted to a signal-processing IC 255 via a flexible substrate 254 which is further provided.

An output terminal of the OEIC 251 for BD is connected with the signal-processing IC 255 via the flexible substrate 253. Further, an output terminal of the OEIC 252 for DVD/CD is connected to the signal-processing IC 255 via the flexible substrate 254. Therefore, it is necessary for the signal-processing IC 255 side to switch between the signals by means of a control signal, whereby either the signal is supplied from the OEIC 251 for BD or the signal is supplied from the OEIC 252 for DVD/CDE.

Furthermore, the conventional optical pickup apparatus 250 requires at least two flexible substrates. Thus, there is a disadvantage that signal interference takes place between the flexible substrates, a noise may be introduced, etc., and a transferred signal may deteriorate, which also leads to a malfunction.

Still further, since two or more (plural) flexible substrates are needed, there is a disadvantage that a space is needed, it is difficult to miniaturize the apparatus, and the cost increases with an increasing number of flexible substrates.

Patent Document 1

Japanese Patent Application Publication No. HEI 9-282705

Patent Document 2

Japanese Patent Application Publication No. 2002-50066

SUMMARY OF THE INVENTION

In an optical pickup apparatus for optical record reproduction provided with a plurality of buffer circuits, or a signal drive apparatus using this optical pickup apparatus, the number of transfer paths for switching and transferring output signals from a plurality of buffer circuits is decreased. When operating one buffer circuit, another buffer circuit is caused to be in an OFF (stop) state. Further, it is arranged that the output circuit of the buffer circuit in the OFF state does not affect the operation of the buffer circuit in operation and that the withstand voltage of the output transistor of the buffer circuit in the OFF state is satisfied.

A signal drive apparatus of the present invention includes a first buffer circuit in which a signal converted into an electric signal from a first light signal is amplified; a second buffer circuit in which a signal converted into an electric signal from a second light signal is amplified; a control circuit for causing one of the first and second buffer circuits to be in an operating state and causing an output stage of the other buffer circuit to be in an idle state of a high impedance, so as to output a changeover control signal which picks up either the first or the second light signal; and a voltage changeover circuit for causing any one of the output stages of the first and the second buffer circuits to be in the idle state and supplying a transistor constituting the output stage with a bias voltage equal to or less than a withstand voltage of the transistor.

An optical pickup apparatus using the signal drive apparatus of the present invention includes a first and a second light receptors; a first buffer circuit in which a first light signal detected by the first light receptor is converted into an electric signal, and then the electric signal is amplified; a second buffer circuit in which a second light signal detected by the second light receptor is converted into an electric signal, and then the electric signal is amplified; a control circuit for causing one of the first and second buffer circuits to be in an operating state and causing an output stage of the other buffer circuit to be in an idle state of a high impedance, so as to output a changeover control signal which picks up either the first or the second light signal; a voltage changeover circuit for causing any one of the output stages of the first and the second buffer circuits to be in the idle state and supplying a transistor constituting the output stage with a bias voltage equal to or less than a withstand voltage of the transistor, so as to maintain the idle state of the transistor and prevent its breakdown; and a signal-processing circuit in which output terminals of the first and the second buffer circuits are connected together and a signal transferred through the connected terminals via a flexible cable is processed.

A signal drive apparatus may be arranged so that output stages (mainly output buffer circuits) of buffer circuits (or drive circuits) each having a PD (photo diode) IC are connected together, one buffer circuit is turned ON, and the other buffer circuit is turned OFF, so as to switch between a DVD (CD) and a BD and avoid mutual influence.

One buffer circuit is turned OFF, and an output impedance is set to a high impedance (also referred to as Hi-Z), so as not to influence the other buffer circuit which is in operation.

In order to turn one of the buffer circuits OFF, a reverse bias voltage is applied across a base and an emitter of a transistor which constitutes an output (buffer) stage, for example, a bipolar transistor. Not only by causing this transistor to be in the OFF state, but also by setting a bias voltage within a reverse-bias withstand voltage ($V_{BEO}$) range of a PN junction between the base and emitter, even if the supply voltage varies or the signal is inputted from the buffer circuit via a common output terminal, it is possible to prevent the output transistor from being destroyed.

Further features of the invention, and the advantages offered thereby, are explained in detail hereinafter, in reference to specific embodiments of the invention illustrated in the accompanying drawings.

DESCRIPTION OF THE PREFERRED EMBODIMENTS

Figure 3:
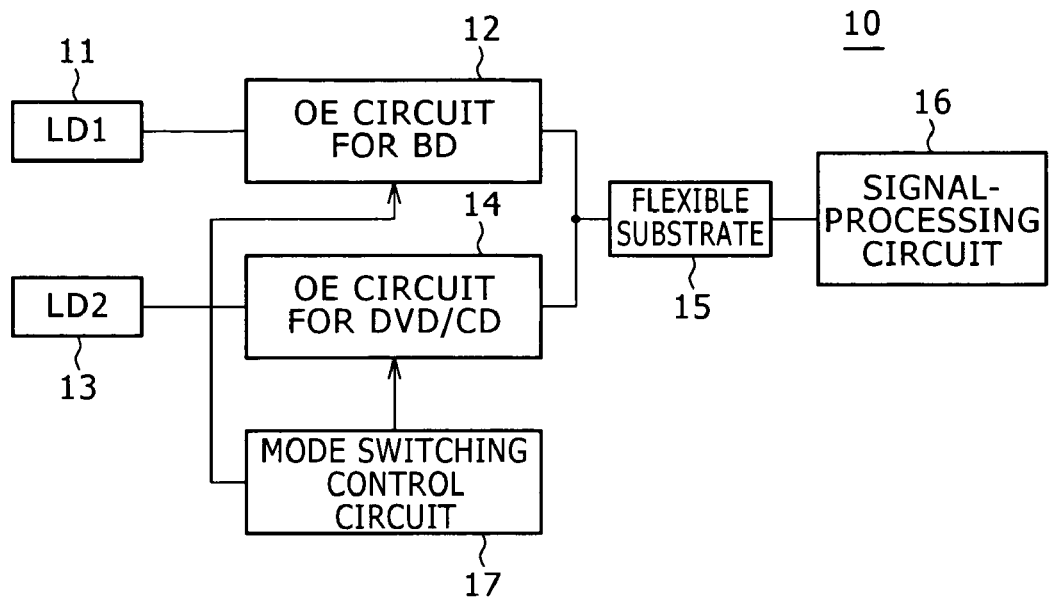
FIG. 3 is a circuit diagram showing in a block diagram an optical pickup apparatus of a preferred embodiment of the present invention.

The whole block diagram of an optical pickup apparatus 10 which is a preferred embodiment is shown in FIG. 3.

The optical pickup apparatus 10 is constituted by an OE (photoelectric conversion) circuit 12 for an LD (laser diode) 1(11), an LD 2(13), and a BD (Blu-ray laser diode), an OE circuit 14 for DVD (digital versatile disk)/CD (compact disc), a mode switching control circuit 17, a flexible substrate 15 (also referred to as a cable), and a signal-processing circuit 16.

The LD 1(11) is constituted by, for example, a Blu-ray laser diode, and it causes a disk to be irradiated with blue-violet light for writing data or reading the data by way of the reflection of laser light.

The OE circuit 12 for BD is constituted by a PD (photo-detector; light detecting element), a light detecting circuit, an amplifier circuit, an output buffer (drive) circuit, etc. Suppose that these are collectively referred to as a buffer circuit.

As for the light of the Blu-ray laser diode reflected by the disk, the light (signal) is converted into photoelectric current by the PD. The photoelectric current is converted into a voltage, and the thus converted voltage is amplified with an amplifier having a low noise property. Then, it is amplified in the OE circuit 12 for BD and outputted to the flexible substrate (cable) 15 from the buffer (drive) circuit provided at a following output unit.

The LD 2(13) is constituted by two types of laser diodes providing different wavelengths for a DVD and a CD, and it switches between and drives the DVD and the CD when in operation.

The OE circuit 14 for the DVD/CD is constituted by a PD (photo-detector; light detecting element), a light detecting circuit, an amplifier circuit, an output buffer (drive) circuit, etc.

The light, reflected by the disk, of the laser diode for DVD or the laser diode for CD is converted into photoelectric (signal) current by the PD. This detected current is converted into a voltage and amplified by an amplifier with a low noise property. Then, this amplified light signal (voltage) is outputted to the same flexible substrate (cable) 15 as that mentioned above from a buffer (drive) circuit provided at a following output unit of the OE circuit 14 for DVD/CD.

The outputs of the OE circuit 12 for BD and the OE circuit 14 for DVD/CD are connected in common to the flexible substrate 15. Thus, while one of them is in operation, the other is in the idle state. Since the signals outputted from the output buffer (drive) circuit of the OE circuit 12 for BD and the OE circuit 14 for DVD/CD are pulse signals, generally their signal amplitude is large.

Even when a pulse signal with this large amplitude is inputted into the output terminal of the output buffer circuit in the idle state, the transistor which constitutes the output buffer (drive) circuit in the idle state is prevented from shifting to the ON operating state. Further, even if the pulse signal voltage supplied to the transistor of the output unit of the buffer circuit in the idle state is equal to or greater than the withstand voltage, the transistor is arranged to avoid a breakdown. The detailed arrangement and operation will be described later.

The mode switching control circuit 17 outputs a control signal (voltage). By means of this control signal, when the LD 1(11) is in operation, for example, the OE circuit 12 for BD is set as the operating state, and the operation of the OE circuit 14 for DVD/CD is set as the idle state.

Further, when the LD 2(13) is in operation, it is arranged that the OE circuit 14 for DVD/CD is set as the operating state and the operation of the OE circuit 12 for BD is set as the idle state.

The flexible substrate 15 is constituted by one piece in the optical pickup apparatus 10, as shown in FIG. 3. Therefore, the space can be reduced, and the noise interference between flexible substrates (cable) can also be reduced.

Figure 1:
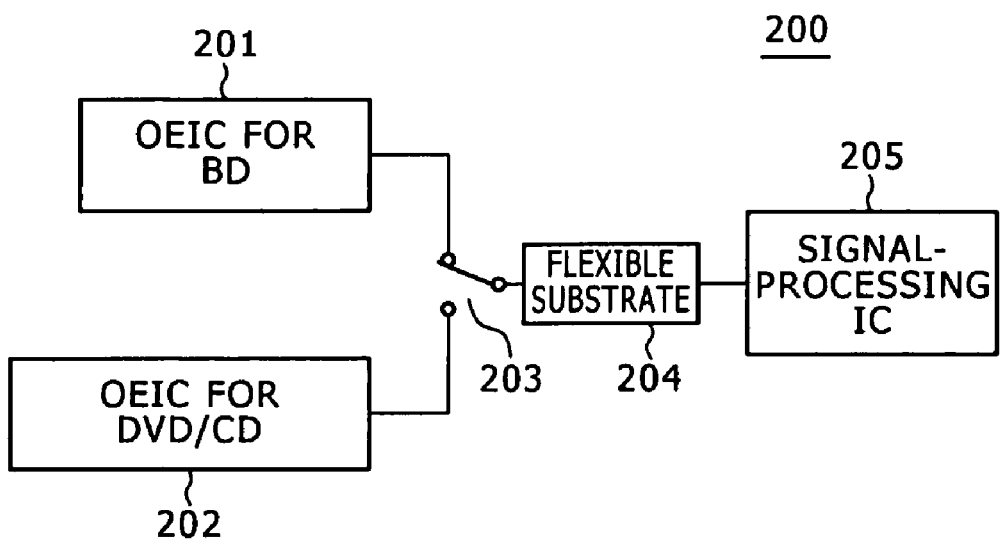
FIG. 1 is a block diagram showing a conventional optical pickup apparatus.

On the other hand, in the conventional optical pickup apparatus as shown in FIG. 1, the number of flexible substrates 204 is one. However, the signals of the OEIC 201 for BD and the OEIC 202 for DVD/CD are arranged to be switched by a switch to transfer the signal. Although the number of flexible substrates 204 is one, input signals are switched by means of a changeover switch 203. Thus, there is a disadvantage that a space is needed in which thus the changeover switch is mounted, thus leading to a high cost.

Figure 2:
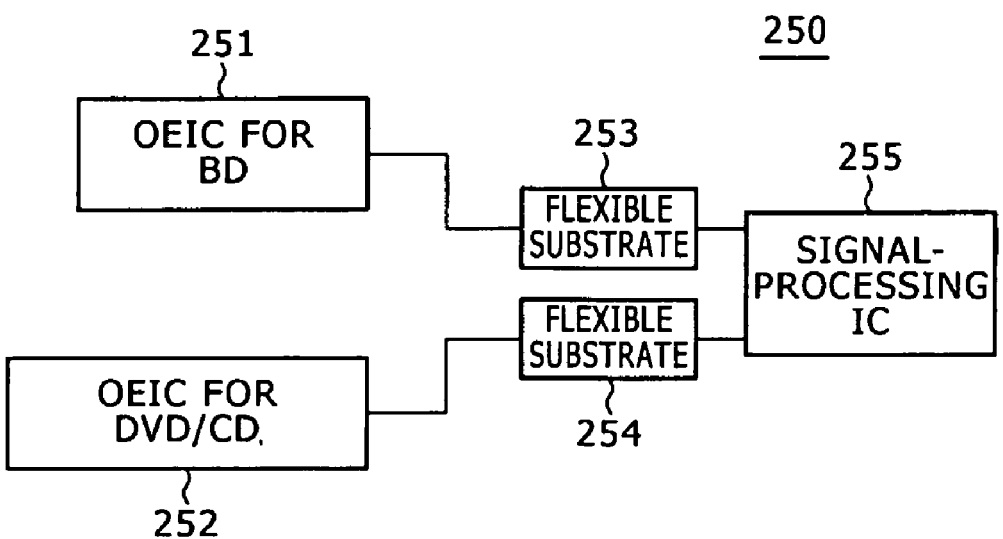
FIG. 2 is a block diagram showing another conventional optical pickup apparatus.

Further, in FIG. 2, two flexible substrates 253 and 254 are used, providing a signal transmission structure in which a signal is not necessarily switched. However, since two flexible substrates 253 and 254 are used, there is a disadvantage that miniaturization is difficult and the cost is high.

As shown in FIG. 3, in the signal-processing circuit 16 of the preferred embodiment, digital processes, such as tracking servo control, focal servo control, spindle control, error correction, video/audio signal reproduction, etc. are carried out.

Figure 4:
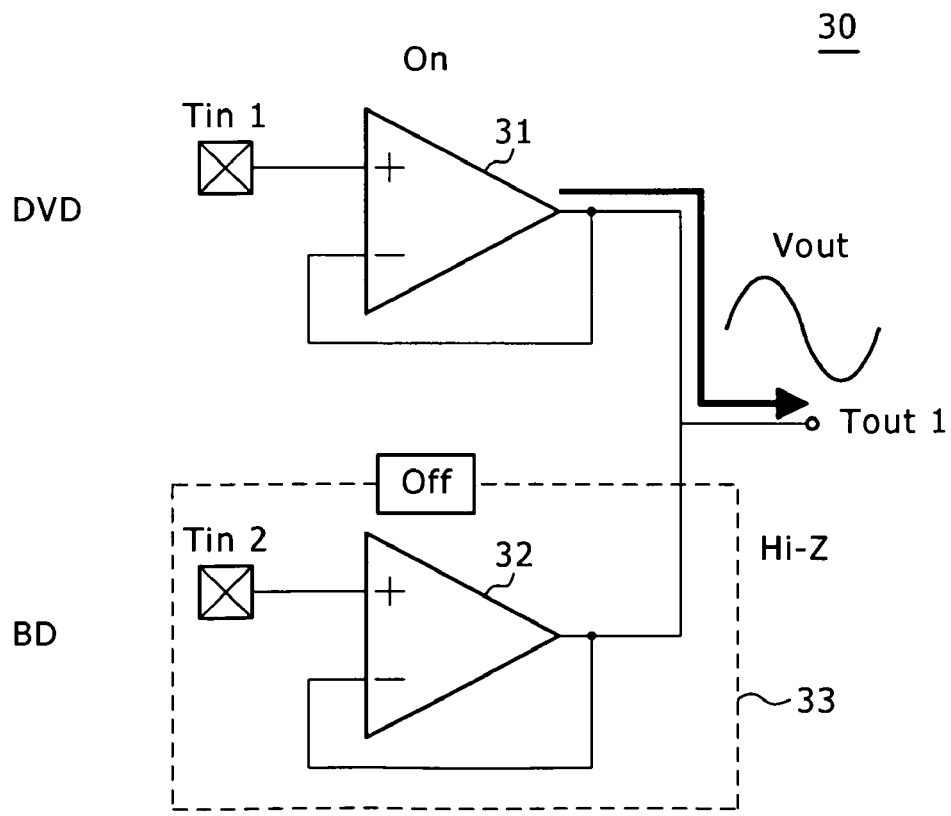
FIG. 4 is a block diagram of an output circuit which constitutes a signal drive apparatus of the optical pickup apparatus as shown in FIG. 3.

FIG. 4 shows a block diagram of a buffer (drive) circuit 30 which constitutes a part of the OE circuit 12 for BD and the OE circuit 14 for DVD/CD as shown in FIG. 3.

For example, after the signal from the LD 2(13) is detected by the PD and amplified by a following amplifier, this amplified pulse signal or a large amplitude sine wave signal is supplied to a terminal Tin1. This input terminal Tin1 is connected to a non-inversing input terminal of a buffer amplifier (or buffer circuit) 31, and an output terminal is connected to an inversing input terminal, an output terminal Tout1, and an output terminal of the buffer amplifier 32 for BD (or buffer circuit).

After the signal from the LD 1(11) is detected by the PD and amplified by the following amplifier, this amplified pulse signal or large amplitude sine wave signal is supplied to an input terminal Tin2.

The input terminal Tin2 is connected to a non-inversing input terminal of the buffer amplifier (circuit) 32, and an output terminal is connected to an inversing input terminal, the output terminal Tout 1, and an output terminal of the buffer amplifier 31 for DVD/CD.

In an example of a circuit structure as shown in FIG. 4, a buffer circuit 31 corresponding to the OE circuit 14 for DVD/CD is in the ON operating state and a buffer circuit 32 corresponding to the OE circuit 12 for BD shows that it is in the OFF (stop) operating state. Output buffer circuits which constitute output stages of the buffer circuits 31 and 32 are arranged such that one output buffer circuit operates and the other output buffer circuit stops (or in the idle state).

Although two buffer circuits are shown here, a structure may be applied in which three or more the buffer circuits are arranged and their outputs are connected together. In this case, only one output buffer circuit may be in the ON state and the other buffer circuits may be in the OFF state.

In FIG. 4, the signal supplied to the input terminal Tin1 is amplified in the buffer circuit 31 and then outputted to the output terminal Tout1. At this time, the laser light outputted from the LD 1(11) is reflected by the disk, the light signal is converted into photoelectric current by the PD, and this photoelectric current is converted into a voltage. The buffer circuit 32 which amplifies this converted electric signal (voltage) is in the idle state, and it increases an output impedance (Hi-Z) of the output stage (circuit) of this buffer circuit 32. Further, this state (Hi-Z) is also referred to as a high impedance.

The output impedance of the buffer circuit 32 in the idle state is arranged to increase so that operation of the output circuit of the buffer circuit 31 may not be affected. Further, at this time, conversely, even if the output pulse signal of the buffer circuit 31 is inputted into the output stage (circuit) of the buffer circuit 32, the transistor which constitutes the output stage of the buffer circuit 32 is turned OFF completely, and a voltage applied to the transistor is arranged so as not to be equal to or greater than a specified withstand voltage.

On the other hand, when the OE circuit for DVD/CD is not in operation and the OE circuit for BD is in the operation state, the circuits operate in reverse to the above.

In other words, after the signal supplied to the input terminal Tint is amplified in the buffer circuit 32, and then it is outputted to the output terminal Tout1. At this time, the buffer circuit 31 which amplifies the signal supplied from a DVD (/CD) is in the idle state, and the output impedance of the output stage (circuit) of this buffer circuit 31 is increased (to Hi-Z).

The output impedance of the buffer circuit 31 is arranged to increase so that operation of the output circuit of the buffer circuit 32 may not be affected. Further, at this time, even if the output pulse signal of the buffer circuit 32 is inputted into the output stage (circuit) of the buffer circuit 31, the transistor is turned OFF completely and the voltage applied to the transistor is set up so as not to exceed the specified withstand voltage.

Therefore, the signal outputted from the output terminal Tout1 can be transferred by one flexible substrate (15), and a signal changeover switch, is not necessarily provided for the input terminal of the flexible substrate 15 specially.

Figure 5:
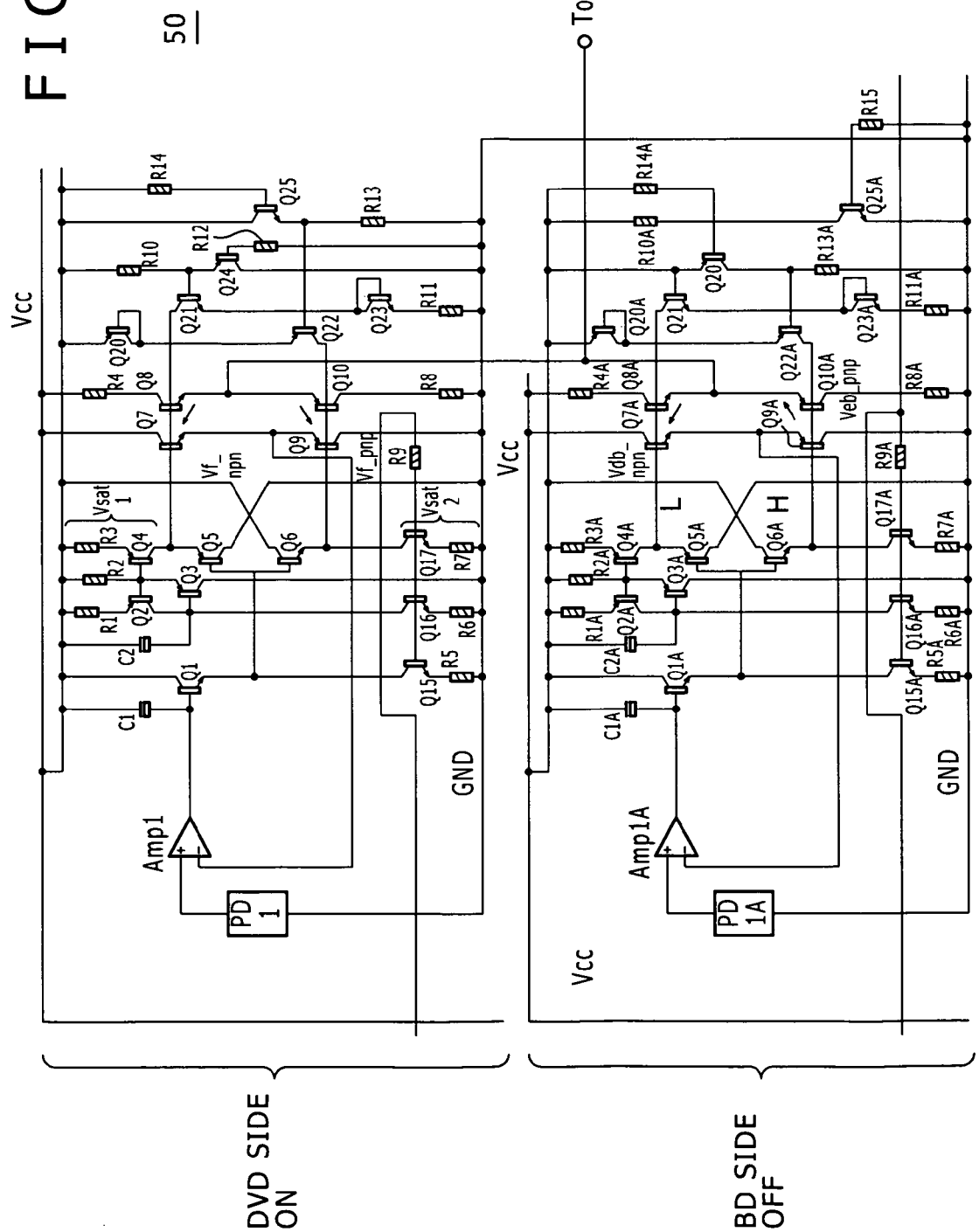
FIG. 5 is a circuit diagram showing a circuit structure of buffer circuits which constitute the signal drive apparatus of another preferred embodiment shown in FIG. 4.
Figure 6:
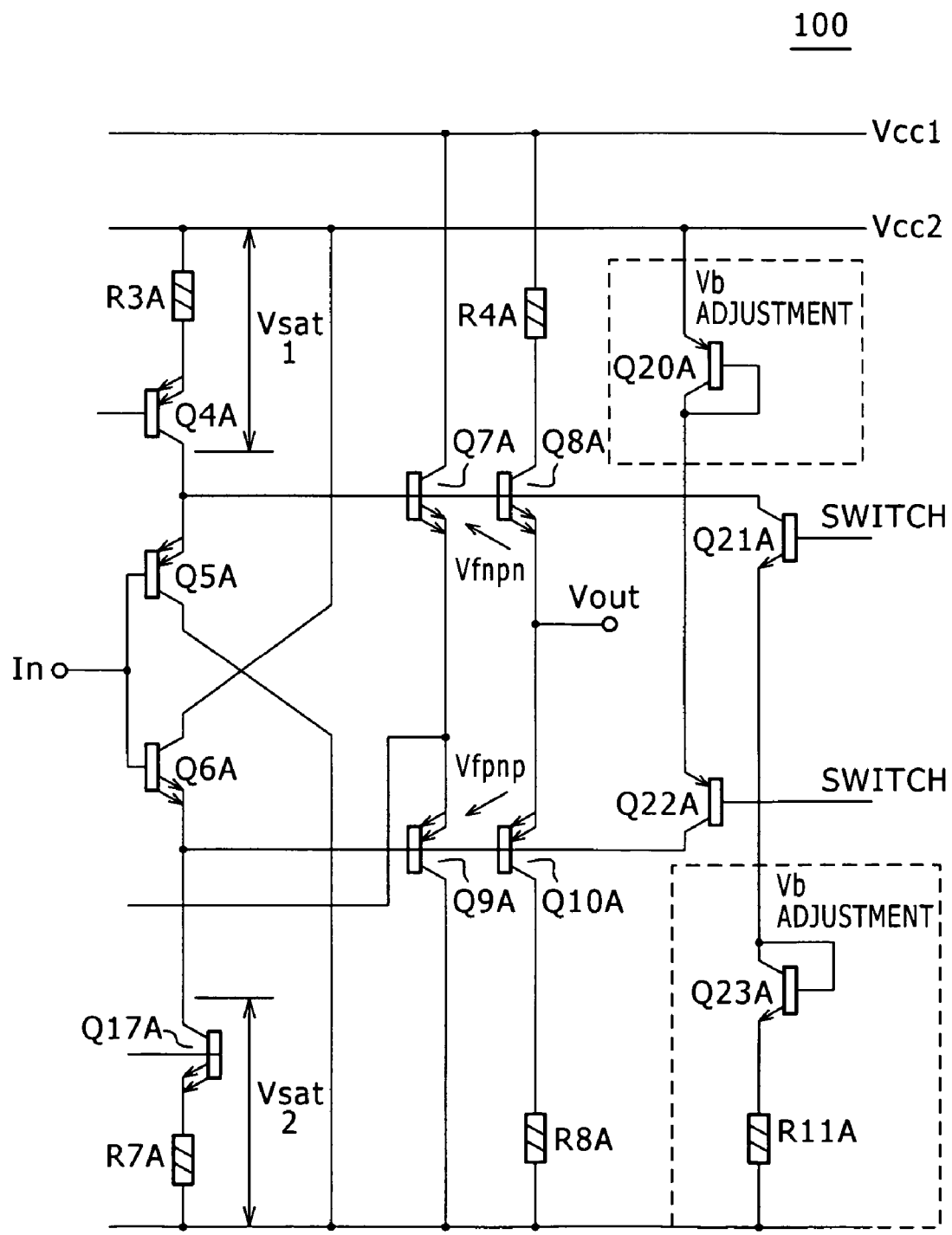
FIG. 6 is a circuit diagram for explaining the operation of an output stage of the buffer circuit as shown in FIG. 5.

Other preferred embodiments of buffer circuits (50, 100) of the optical pickup apparatus as shown in FIG. 4 are illustrated in FIG. 5 and FIG. 6.

A signal drive apparatus 50 in the optical pickup apparatus as shown in FIG. 5 is constituted by a drive circuit on the DVD (/CD) side, and a buffer circuit on the BD side. Circuit structures of both the buffer circuits are the same in the preferred embodiments.

Now, the present invention will be described with reference to an example of a circuit structure on the DVD (/CD) side.

An output of a PD (photo diode; diode for optical detection) 1 is connected to a non-inversing input terminal of an Amp (amplifier) 1, and an output of the Amp 1 is connected to a base of the NPN transistor Q1 and one terminal of a capacitor C1. The other terminal of the capacitor C1 is connected to a power supply VCC. A collector of the NPN transistor Q1 is connected to the power supply VCC. Its emitter is connected to a collector of the NPN transistor Q15, and an emitter of this NPN transistor Q15 is connected to GND (ground) via a resistor R5.

An emitter of the PNP transistor Q2 is connected to the power supply VCC via a resistor R1, and its collector is connected to a collector of the NPN transistor Q16. A base of the PNP transistor Q2 is connected respectively to one terminal of a resistor R2, an emitter of a PNP transistor Q3, and a base of a PNP transistor Q4. Further, the other terminal of the resistor R2 is connected to the power supply VCC.

A base of the NPN transistor Q16 is connected to a base of the NPN transistor Q15, an emitter of the NPN transistor Q16 is connected to one terminal of resistor R6, and the other terminal of resistor R6 is connected to GND.

A base of the PNP transistor Q3 is connected to a collector of the PNP transistor Q2 and one terminal of a capacitor C2, and the other terminal of the capacitor C2 is connected to the power supply VCC.

Further, an emitter of the NPN transistor Q1 is connected respectively to a base of an NPN transistor Q6 and a base of a PNP transistor Q5, and an emitter of the NPN transistor Q6 is connected respectively to a collector of an NPN transistor Q17, bases of PNP transistors Q9 and Q10, and a collector of a PNP transistor Q22. A base of the NPN transistor Q17 is connected to the base of the NPN transistor Q16, and an emitter of the NPN transistor Q17 is connected to GND via a resistor R7. Further, a collector of the NPN transistor Q6 is connected to the power supply VCC.

An emitter of the PNP transistor Q5 is connected to a collector of the PNP transistor Q4, bases of NPN transistors Q7 and Q8, and a collector of an NPN transistor Q21. The base of the PNP transistor Q4 is connected to the base of the PNP transistor Q2 and one terminal of the resistor R2, and the other terminal of the resistor R2 is connected to the power supply VCC. Further, an emitter of the PNP transistor Q4 is connected to the power supply VCC via a resistor R3.

An emitter of a PNP transistor Q9 is connected to an inversing input terminal of the Amp 1 and an emitter of an NPN transistor Q7, and a collector of the PNP transistor Q9 is connected to GND. A collector of the NPN transistor Q7 is connected to the power supply VCC. This power supply VCC is formed of another pattern that is different from a power supply line of a small amplitude, in order to prevent a large amplitude noise due to the output pulse signal from being introduced into a circuit which operates at a small amplitude.

A collector of an NPN transistor Q8 is connected to the power supply VCC via a resistor R4, its emitter is connected to an emitter of the PNP transistor Q10, and a collector of this PNP transistor Q10 is connected to GND via a resistor R8.

Further, a common connection point of both emitters of an NPN transistor 8 and the PNP transistor Q10 is connected to a common connection point of both emitters of an NPN transistor 8A and a PNP transistor Q10A in the same circuit structure on the BD side, and also connected with the output terminal Tout.

An emitter of the PNP transistor Q22 is connected to a base and a collector of a PNP transistor Q20, and the collector of the PNP transistor Q20 is connected to the power supply VCC. Further, a base of the PNP transistor Q22 is connected to an emitter of an NPN transistor Q25.

An emitter of the NPN transistor Q21 is connected to a collector and a base of an NPN transistor Q23, and a base of the NPN transistor Q21 is connected to an emitter of a PNP transistor Q24. An emitter of the NPN transistor Q23 is connected to GND via a resistor R11.

The emitter of the PNP transistor Q24 is connected to the power supply VCC via a resistor R10, a collector of the PNP transistor Q24 is connected to GND, and a base of the PNP transistor Q24 is connected to a reference voltage via a resistor R12. In this example of the circuit, the base is connected to GND via the resistor R12.

A collector of the NPN transistor Q25 is connected to the power supply VCC, its emitter is connected to the base of the PNP transistor Q22 and one terminal of a resistor R13, and the other terminal of the resistor R13 is connected to GND. Further, the base of the NPN transistor Q15 is connected to the reference potential via a resistor R14. It is connected with the power supply VCC in this example of the circuit.

The PNP transistor Q24 and the NPN transistor Q25 constitute a switch SW. The bases of the PNP transistor Q24 and the NPN transistor Q25 are supplied with the reference voltage via the resistors such that output NPN transistors Q7 and Q8 and the PNP transistors Q9 and Q10 may be operated and turned ON/OFF.

Further, since a circuit connection structure of the buffer circuit on the BD side is the same as the circuit structure on the DVD (/CD) side, "A" is further appended to the reference numeral of each element.

A common connection point of the NPN transistor Q8 and the PNP transistor Q10 and a common connection point of an NPN transistor Q8A and a PNP transistor Q10A are connected to the output terminal Tout, and any one of the output signals is outputted.

In the buffer circuit (50) on the DVD (/CD) side in FIG. 5, since the base of the PNP transistor Q24 is at the GND (ground) level, it is in the ON operating state. Since the base of the NPN transistor Q25 is connected to the power supply VCC via the resistor R14, its potential is at the power supply VCC level, and it is in the ON operating state.

Conversely, in the buffer circuit on the BD side, since a base of PNP transistor Q24A is connected to the power supply VCC, it is in the OFF operating state. Since a base of an NPN transistor Q25A is connected to GND via a resistor R15A, its potential is at the grand level of 0V, and it is in the OFF operating state.

Now, operation of the signal drive apparatus 50 as shown in FIG. 5 will be described.

In FIG. 5, the PNP transistor Q24 and the NPN transistor Q25 are in the ON operation. Supposing that the level is in a saturation state, an emitter potential of the PNP transistor Q24 is at a voltage increased by Vice from the GND (ground) level. As a result, the base of the NPN transistor Q21 is at a voltage equal to or less than Vf, and it is in the OFF operating state. Then, its collector is in a floating state; however, it is set to a potential which depends on the base (collector of the PNP transistor Q4) of the NPN transistor Q8.

On the other hand, since the base of the NPN transistor Q25 is connected to the power supply VCC, it is in the ON operating state. Supposing that the level is at the saturation level, the emitter potential rises to VCC-Vice. Since this emitter potential is supplied to the base of the PNP transistor Q22, this NPN transistor Q22 is in the OFF operating state. Since its collector is connected with the base of the PNP transistor Q10, it is set to the potential (the collector of the NPN transistor Q17).

In this state, since the NPN transistor Q21 and the PNP transistor Q22 which constitute the switch are turned OFF, the switch does not influence the output transistor Q8 and the PNP transistor Q10 in the buffer circuit.

A photovoltage signal amplified by the Amp 1 is supplied to the NPN transistor Q1 which constitutes an emitter-follower circuit, where it is level-shifted by 1 Vf (forward junction voltage of diode) and supplied to the bases of the PNP transistor Q5 and the NPN transistor Q6, which constitute a diamond output circuit.

The signal is outputted to the output terminal Tout from the emitters of the NPN transistor Q8 and the PNP transistor Q10, which increase the drive capability in this diamond output circuit and constitute the output stage. However, at this time, the pulse signal outputted to the Tout is also outputted to the output terminal on the BD side buffer circuit, which is in OFF operation.

Although the buffer circuit on the BD side is in the OFF operation, the emitter potentials of the NPN transistor Q8A and the PNP transistor Q10A which constitute the buffer circuit may vary according to the maximum and minimum amplitude levels of the pulse signal outputted from the output terminal Tout, and these emitter potentials should be set less than a base-emitter withstand voltage ($V_{BEO}$). Thus, the base potential should be set up so that this condition may be satisfied, and the operation of the transistor may be turned OFF completely, for example.

Next, a bias setting method for the circuit when the buffer circuit on the BD side is turned OFF will be described with reference to FIG. 6. Reference numerals provided for elements of a buffer circuit 100 as shown in FIG. 6 are the same as those for the elements in the buffer circuit on the BD side as shown in FIG. 5, respectively.

In FIG. 6, a PNP transistor Q20A of a diode structure is connected with an emitter of a PNP transistor Q22A, which constitutes a switch, constructing a Vb adjustment circuit.

The PNP transistor Q22A sets up a base voltage of the PNP transistor Q10A in an output stage (circuit), when the buffer circuit is in the idle state.

Further, the NPN transistor Q23A of the diode structure connected to an emitter of an NPN transistor Q21A, which constitutes the switch, and a resistor R11A connected to the NPN transistor Q23A constitute the Vb adjustment circuit. The transistor Q21A sets up a base voltage of the NPN transistor Q8A in the output circuit, when the buffer circuit is in the idle state.

Even if a pulse-voltage waveform is inputted into the output terminal Vout of the buffer circuit 100 in the idle state from the drive circuit in the ON operation, the OFF operation is maintained. Further, for example, the NPN transistor Q8A and the PNP transistor Q10A, which constitute the output stage (circuit) of this buffer circuit 100, should be prevented from being destroyed. In order to realize this, the Vb adjustment circuit (voltage changeover circuit) is provided which sets up the base voltage of each transistor of the output circuit.

Now, it is assumed that the withstand voltage conditions for the NPN transistor Q8A and the PNP transistor Q10A which constitute the output circuit of the buffer circuit 100 are such that $V_{BEO}$ is 3.5 V for the NPN transistor and $V_{BEO}$ is 4.0 V for a V(vertical type)-PNP transistor, for example. This withstand voltage depends on IC manufacturing conditions. If it changes according to variations of the manufacturing conditions, it is necessary to set up a Vb adjustment voltage according to the withstand voltage in accordance with this change.

By fixing base potentials of the NPN transistor Q8A of the output stage (circuit) and the V-PNP transistor Q10A and turning OFF, circuit operation of the output stage (circuit) is stopped. At this time, due to the voltage change of an output signal Vout of the output terminal Tout, a reverse-bias voltage is applied to a junction section between the NPN transistor Q8A and the PNP transistor Q10A in the output circuit. A range of voltage variations in the output circuit is represented by:

$$\text{Maximum; VCC-Vfnpn-Vsat1} \quad (1)$$

$$\text{Minimum; Vfpnp+Vsat2} \quad (2),$$

being equivalent to a D (dynamic) range, where VCC is a power supply (voltage), Vfnpn is a forward junction voltage of an NPN transistor, Vsat1 is a value obtained by adding a collector-emitter saturation voltage of a PNP transistor Q4A to a voltage generated by a resistor R3A, Vfpnp is a forward junction voltage of a PNP transistor, and Vsat2 is a value obtained by adding a collector emitters saturation voltage of an NPN transistor Q17A to a voltage generated by a resistor R7A.

Next, conditions in which the NPN transistor Q8A and the PNP transistor Q10A are turned off will be described.

As the Vsat1 and Vsat2 increase or decrease, the D (dynamic) range changes, which is adjusted to determine Vmax in Equation (1) and Vmin in Equation (2). In particular, as the resistors R3A and R7A increase in resistance, Vsat1 and Vsat2 increase. Conversely, as the resistors R3A and R7A decrease in resistance, Vsat1 and Vsat2 decrease.

Conditions in which the NPN transistor Q8A and the PNP transistor Q10A are turned OFF will be described.

The switch Q21A connected to the base of the NPN transistor Q8A is turned ON, and the voltage (Vb) for setting OFF is supplied to the base of the NPN transistor Q8A.

In other words, it is necessary to cause a voltage (Vb_npn) to be at a LOW (low) level. The voltage is output via the collector of the NPN transistor Q21A from the Vb adjustment circuit which is constituted by the NPN transistor Q23A and the resistor R11A. Now, assuming that a base voltage for turning OFF the NPN transistor Q8A is Voff_npn, then the condition is expressed as Vb_npn<Vmin+Voff_npn. Now, in order to cause the conditions to be severer, it is necessary to cause Voff_npn to be smaller than the forward junction voltage Vf.

On the other hand, a base of the V-PNP transistor Q10A is connected to a collector of the PNP transistor Q22A of the switch, and the emitter of the PNP transistor Q22A is connected to a base and a collector of the NPN transistor Q20A of the diode structure. The switch PNP transistor Q22A is turned ON, and a voltage of a high level is supplied to the base of the PNP transistor Q10A to be turned OFF.

In order to turn OFF the PNP transistor Q10A, the voltage outputted from the Vb adjustment circuit is equal to or greater than Vmax−Voff_pnp and is expressed as Vmax−Voff_pnp<Vb_pnp. Now, in order to cause the conditions to be severer, it is necessary to cause the voltage Voff_pnp when the PNP transistor Q10A is OFF to be smaller than the forward junction voltage Vf. These conditions will be described later.

Next, the withstand voltage conditions for the NPN transistor Q8A and the PNP transistor Q10A will be described.

As for the NPN transistor Q8A, its base potential is caused to be low to turn it OFF by lowering Vf of the diode which is constituted by the NPN transistor Q23A, and a voltage generated by the resistor R11A.

The severest conditions for the withstand voltage are when the base voltage (Vb_npn) of the NPN transistor is the lowest and when the voltage of the output terminal Vout is the highest (Vmax).

In other words, this is the case when, due to variations of the supply voltage, a difference between the pulse signal (Vmax) from the output terminal Vout, which is the emitter of NPN transistor Q8A, and the voltage (Vb_npn) outputted from the Vb adjustment (circuit) is equal to or less than the base-emitter withstand voltage $V_{BEO}$ of the NPN transistor Q8A, which is expressed as Vmax−Vb_npn<$V_{BEO}$.

On the other hand, as with the PNP transistor Q10A, the base voltage Vb_pnp of the PNP transistor Q10A is set up to be high (Vcc−Vf) to turn it OFF. The severest conditions for the withstand voltage are when the output terminal Vout is at the minimum voltage.

At this time, it is preferable that a difference between the base voltage (Vb_pnp) of the PNP transistor Q10A and the voltage (Vmin) of output terminal Vout is equal to or less than the base-emitter withstand voltage $V_{BEO}$. In other words, it is expressed as Vb_pnp−Vmin<$V_{BEO}$.

The conditions described above for turning OFF a transistor and satisfying the withstand voltage are summarized and expressed as follows:

$$\text{NPN: } Vmax - V_{BEO} < Vb\_npn < Vmin + Voff\_npn \quad (3)$$

$$\text{PNP: } Vmax - Voff\_pnp < Vb\_pnp < Vmin + V_{BEO} \quad (4)$$

Now, suppose that the supply voltage Vcc is varied from 5.00 V to 5.5 V. Let the conditions for causing the NPN transistor Q8A and PNP transistor Q10A to be OFF be the forward junction voltage which is 1/1000 of the collector current Ic at the time of ON.

Calculating this, Voff_npn is approximately 411 mV for the NPN transistor, and Voff_pnp is approximately 425 mV for the PNP transistor. Here, to allow more margin, it is assumed that both the voltages are 300 mV, and then the description will be carried out as follows.

Further, now it is assumed that the output minimum Vmin is approximately 895 mV when the supply voltage Vcc is the lowest, and then as for the NPN transistor Q8A, Voff_npn of 300 mV is added to Vmin, resulting in Vb_npn<1195 mV.

As with the PNP transistor Q10A, the variations of the supply voltage Vcc (=5V) are considerable. When it is the minimum, Vmax=4.585V. Further, it is assumed that the junction voltage (Voff_pnp) at the time of OFF is 300 mV with some margin, and then subtraction of Voff_pnp of 300 mV from Vmax results in 4285 mV<Vb_pnp.

Next, the withstand voltage will be described. The NPN transistor Q8A is such that Vmax−$V_{BEO}$<Vb_npn. Since the withstand voltage of a transistor changes with process requirements, it is assumed for example that $V_{BEO}$=3.5 V and then subtraction of $V_{BEO}$ of 3.5V from Vmax of 4.585V results in Vb_npn>1085 mV. Further, as for the PNP transistor Q10A, since Vb_pnp<Vmin+$V_{BEO}$, assuming that $V_{BEO}$=4, addition of Vmin of 895 mV to this value gives Vb_pnp<4895 mV.

Consequently, when the Vcc is varied from 5.0 V to 5.5 V, the NPN transistor is such that 1085 mV<Vb_npn<1195 mV and a Vb variable range is 110 mV.

Further, when the Vcc is varied from 5.0 to 5.5 V, the PNP transistor is such that 4285 mV<Vb_pnp<4895 mV and the Vb variable range is 610 mV.

Thus, even when the voltage Vb outputted from the Vb adjustment (circuit) that is the fixed base voltage changes due to the variations, as far as it is in the voltage range as mentioned above, the NPN transistor Q8A and the PNP transistor Q10A at the output stage are maintained in the OFF operating state, and at the same time the withstand voltage of the transistor also is satisfied, thus preventing the destruction.

Figure 7:
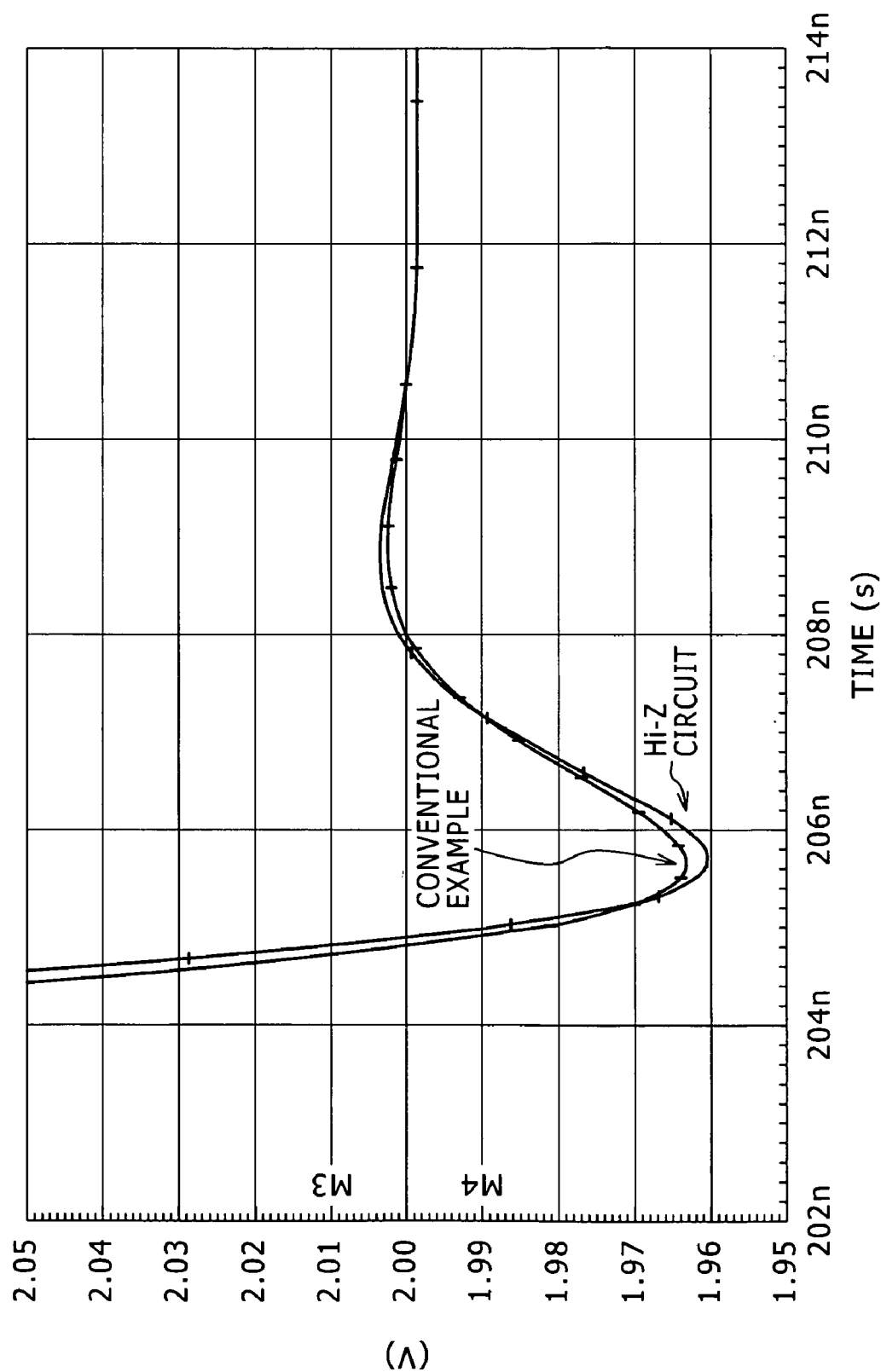
FIG. 7 is a chart showing output waveforms from the buffer circuit as shown in FIG. 6.

FIG. 7 shows waveforms at the output terminal Vout when the buffer circuit on the DVD (/CD) side as shown in FIGS. 4, and 5 is turned ON and the buffer circuit on the BD side is turned OFF and when a pulse-shape signal is applied to the input of the drive circuit, where a waveform chart of a falling waveform which is a part of an output waveform is shown. At the same time, a falling waveform chart is shown when the output terminals of the drive circuit on the DVD (/CD) side and the buffer circuit on the BD side are disconnected completely (in FIG. 7 it is indicated as "conventional example").

An output voltage value is shown along a vertical axis graduated in steps of 10 mV, and a horizontal axis shows time graduated in 2 n (nano) second divisions.

In the waveform chart, as for the minimum voltage of an undershoot of the output waveform, the output voltage value of the Hi-Z (high impedance) circuit of the buffer (drive) circuits (signal drive apparatus) 30 and 50 as shown in FIGS. 4 and 5 is only about 3 mV lower than the output voltage in the conventional example. In other areas, there is substantially no differences in output voltage. In other words, it is shown that there is substantially no degradation of the output waveform.

As described above, the output stages (circuit) of the buffer circuit of OEIC each containing the PD (photo diode) are connected together, one buffer circuit is turned ON, the other buffer circuit is turned OFF, and the output signals of DVD (/CD) and BD, for example, are alternatively switched, to thereby avoid mutual influence.

In order to turn OFF one buffer circuit, the bias of the output transistor which constitutes the output buffer circuit of the buffer circuit is forcibly fixed. And, at this time, the output impedance is caused to be the high impedance (Hi-Z) such that the operation of the other buffer circuit in operation may not be affected.

Further, by satisfing the withstand voltage of the transistor which constitutes the output stage of the buffer circuit in the OFF state, it is possible to prevent the transistor of the output buffer circuit of the buffer circuit in the OFF operating state from being destroyed.

It should be understood by those skilled in the art that various modifications, combinations, sub-combinations and alterations may occur depending on design requirements and other factors insofar as they are within the scope of the appended claims or the equivalents thereof.

The present invention contains subject mater related to Japanese Patent Application JP2005-183743 filed in the Japanese Patent Office on Jun. 23, 2005, the entire contents of which are incorporated herein by reference.

What is claimed is:

1. A signal drive apparatus comprising:
a first buffer circuit that receives an amplified electrical signal from a first light signal from a first input terminal;
a second buffer circuit that receives an amplified electrical signal from a second light signal from a second input terminal;
a control circuit for causing one of said first and second buffer circuits to be in an operating state and causing an output stage of the other buffer circuit to be in an idle state of a high impedance, so as to output a changeover control signal which picks up either said first or said second light signal;
a voltage changeover circuit for causing any one of the output stages of said first and the second buffer circuits to be in the idle state and supplying a transistor constituting said output stage with a bias voltage equal to or less than a withstand voltage of said transistor; and
a flexible substrate that receives said electrical signal from said first buffer circuit when the control circuit causes said first buffer circuit to be in an operating state or receives said electrical signal from said second buffer circuit when the control circuit causes said second buffer circuit to be in an operating state,
wherein the first input terminal is connected to a non-inverting input terminal of the first buffer circuit, and wherein an output of the first buffer circuit is connectively fed back to an inverting input terminal located on the first buffer circuit, directly connected to an output terminal, and directly connected to an output of the second buffer circuit, and
wherein the second input terminal is connected to a non-inverting input terminal of the second buffer circuit, and wherein the output of the second buffer circuit is connectively fed back to an inverting input terminal located on the second buffer circuit, directly connected to the output terminal, and directly connected to the output of the first buffer circuit.

2. The signal drive apparatus according to claim 1, wherein said first buffer circuit converts a signal which is outputted from a blue violet laser diode and reflected by a disk into an electric signal by means of a first light receptor and amplifies the converted signal; and said second buffer circuit converts a signal which is outputted from a laser diode for a DVD or a CD and reflected by the disk into an electric signal by means of a second light receptor and amplifies the converted signal.

3. The signal drive apparatus according to claim 1, wherein a transistor at the output stage of each of said first and second buffer circuits is constituted by a bipolar transistor, and a voltage equal to or less than a base-emitter withstand voltage is supplied to the base from said voltage changeover circuit.

4. An optical pickup apparatus comprising:
a first and a second light receptors;

a first buffer circuit wherein a first light signal detected by the first light receptor is converted into an electric signal, said electric signal is amplified and supplied to a first input terminal;

a second buffer circuit wherein a second light signal detected by the second light receptor is converted into an electric signal, said electric signal is amplified and supplied to a second input terminal;

a control circuit for causing one of said first and second buffer circuits to be in an operating state and causing an output stage of the other buffer circuit to be in an idle state of a high impedance, so as to output a changeover control signal which picks up either said first or said second light signal;

a voltage changeover circuit for causing any one of the output stages of said first and the second buffer circuits to be in the idle state and supplying a transistor constituting said output stage with a bias voltage equal to or less than a withstand voltage of said transistor, so as to maintain the idle state of said transistor and prevent its breakdown;

a flexible substrate that receives said electrical signal from said first buffer circuit when the control circuit causes said first buffer circuit to be in an operating state or receives said electrical signal from said second buffer circuit when the control circuit causes said second buffer circuit to be in an operating state; and a signal-processing circuit in which output terminals of said first and the second buffer circuits are connected together and a signal transferred through the connected terminals via said flexible substrate is processed, wherein the first input terminal is connected to a non-inverting input terminal of the first buffer circuit, and wherein an output of the first buffer circuit is connectively fed back to an inverting input terminal located on the first buffer circuit, directly connected to an output terminal, and directly connected to an output of the second buffer circuit, and wherein the second input terminal is connected to a non-inverting input terminal of the second buffer circuit, and wherein the output of the second buffer circuit is connectively fed back to an inverting input terminal located on the second buffer circuit, directly connected to the output terminal, and directly connected to the output of the first buffer circuit.

5. The optical pickup apparatus according to claim 4, wherein said first buffer circuit converts a signal which is outputted from a blue violet laser diode and reflected by a disk into an electric signal by means of a first light receptor and amplifies the converted signal; and said second buffer circuit converts a signal which is outputted from a laser diode for a DVD or a CD and reflected by the disk into an electric signal by means of a second light receptor and amplifies the converted signal.

6. The optical pickup apparatus according to claim 4, wherein said voltage changeover circuit outputs a voltage equal to or less than a base-emitter withstand voltage to a base of a bipolar transistor at an output stage of said first or second buffer circuit, and causes said bipolar transistor to be in the idle state.

* * * * *